April 18, 1933.  C. A. RUDQVIST  1,903,943
CLUTCHING DEVICE
Filed June 14, 1929
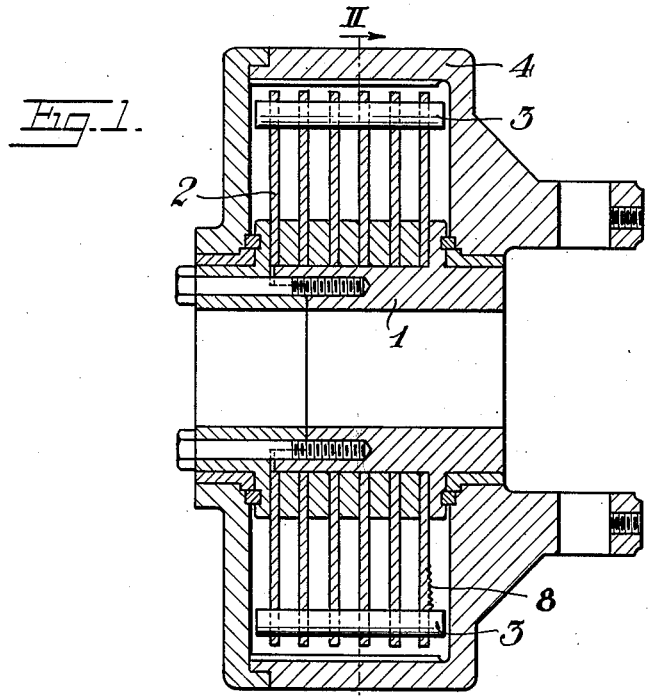
Fig.1.
Fig.2.
Fig.3.
Fig.4.
Fig.5.
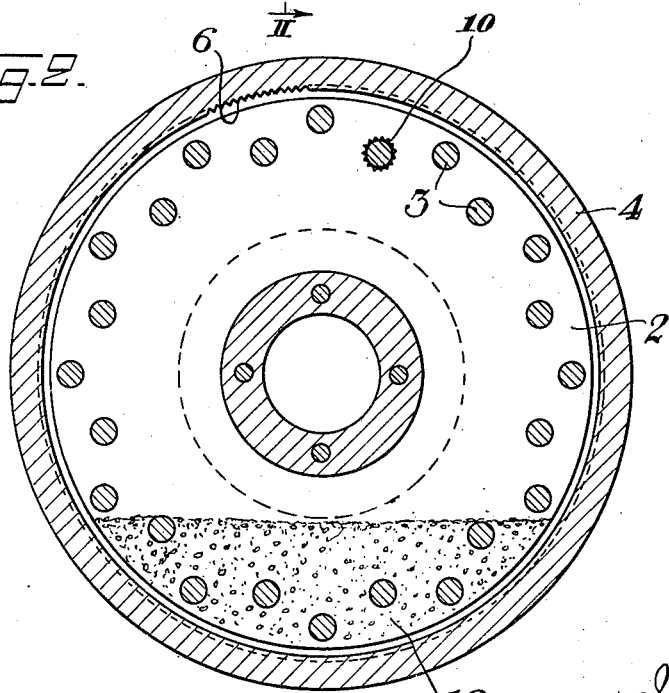
Inventor,
Carl A. Rudqvist,
By Henry Orth Jr
Atty.

Patented Apr. 18, 1933

1,903,943

UNITED STATES PATENT OFFICE

CARL AUGUST RUDQVIST, OF STOCKHOLM, SWEDEN, ASSIGNOR TO PULVIS AKTIEN-GESELLSCHAFT, OF GLARUS, SWITZERLAND

CLUTCHING DEVICE

Application filed June 14, 1929, Serial No. 370,930, and in Sweden March 13, 1929.

My invention relates to clutches and more particularly to clutches containing powdered material or shot.

This invention has for its object to provide an improved clutch of the said type in which a uniform distribution of the powder is secured in a simple and efficient way. As a result, the stresses on the clutch will be uniformly distributed, and unbalance and grating will be prevented.

The principal feature of the invention resides in the provision of axial bolts of one shape or another carried by radial members mounted on a hub and enclosed within a drum containing a powdered material.

In the drawing one embodiment of the invention is illustrated. Fig. 1 is an axial section of a clutching device according to the embodiment. Fig. 2 is a cross section taken on the line II—II in Fig. 1. Figs. 3 to 5 show various forms of bolts usable in the clutch.

With reference to the drawing, the numeral 1 indicates a hub or wheel adapted to be keyed to one of the shafts to be coupled together by the clutch. The hub 1 carries a plurality of disk shaped elements 2 lying in planes at right angles to the axis of the hub 1 and spaced apart in axial direction. Said disk shaped elements carry, near their circumference, a plurality of axial bolts 3 extending through holes in all of the disks 2. Said bolts are uniformly distributed around the entire periphery of the disks, as will appear from Fig. 2. Journaled upon end portions of the hub 1 is a surrounding casing or drum 4 which is adapted to be connected to the other one of the shafts to be coupled together. Said casing or drum is partially filled with a powdered, grainy or similar material 12 such as small ferrous chilled shot of a diameter of from 5 to 20 thousandths of an inch mixed with a few percent of graphite.

Assuming that the wheel 1 is keyed to the driving shaft, the operation is as follows. Upon rotation of said shaft, the wheel 1 will take the powdered material with it, at the first instant by means of the bolts 3 and then also by friction against the disk shaped elements 2, causing the material in its turn to rotate the casing 4 by being thrown against the outer portion thereof under the action of the centrifugal force.

Assuming, on the other hand, that the casing 4 is the driving clutch member, said casing, when in rotation, will cause the powdered material to rotate the wheel 1. It is to be noted that sufficient spaces are left between the individual disks and bolts of the wheel to allow the powdered or similar material to distribute itself uniformly in the circumferential direction during the rotation, thereby securing balance. The clutching device will, as a result, be highly flexible and the large total area of the bolts and disks of the wheel will render the clutching device very efficient, at the same time securing a uniform distribution of the stresses on the clutch around the periphery and preventing any grating.

The inner side of the casing may be serrated, as indicated at 6 in Fig. 2, the bolts 3 may be serrated as shown at 10 and the disks 2 may also be serrated as shown at 8. The shape of the bolts 3 may be different from that shown. For instance, they may be semi-cylindrical as shown at 3a in Fig. 3, square-edged as shown at 3b in Fig. 4, triangular as shown at 3c in Fig. 5 or of any other appropriate shape.

What I claim is:

1. In a clutching device, a hub, a drum shaped casing rotatably surrounding said hub and containing a powdered material, disk shaped members carried by said hub, and substantially axial bolts carried by said disk shaped members.

2. In a clutching device, a hub, a drum shaped casing rotatably surrounding said hub and containing a powdered material, a set of parallel disks carried by said hub, and a set of axial bolts carried by said disks near the periphery thereof.

3. In a clutching device, a hub, a drum shaped casing rotatably surrounding said hub and containing a powdered material, a set of axially spaced annular disks carried by said hub and extending nearly to the periphery of the outer portion of said casing, and axial bolts carried by said disks near the periphery thereof, said bolts being uniformly distributed in circumferential direction.

4. In a clutching device, a hub, a drum shaped casing rotatably surrounding said hub and containing a powdered material, a set of axially spaced annular disks carried by said hub and extending nearly to the periphery of the outer portion of said casing, and axial bolts carried by said disks near the periphery thereof, said outer portion being provided with serrations on its inner surface.

5. In a clutching device, a hub, a drum shaped casing rotatably surrounding said hub and containing a powdered material, a set of axially spaced annular disks carried by said hub and extending nearly to the periphery of the outer portion of said casing, and axial bolts carried by said disks near the periphery thereof, said bolts and disks being provided with serrations.

6. In a clutching device, a hub, a drum shaped casing rotatably surrounding said hub and containing a powdered material, radial members carried by said hub, and substantially axial bolts supported at a plurality of points by said radial members.

7. In a clutching device, a hub, a drum shaped casing rotatably surrounding said hub and containing a powdered material, radial members carried by said hub, and substantially axial rounded bolts supported at a plurality of points by said radial members.

8. In a clutching device, a hub, a drum shaped casing rotatably surrounding said hub and containing a powdered material, radial members carried by said hub, and substantially axial four-sided bolts supported at a plurality of points by said radial members.

9. In a clutching device, a hub, a drum shaped casing rotatably surrounding said hub and containing a powdered material, radial members carried by said hub, and substantially axial three-sided bolts supported at a plurality of points by said radial members.

10. In a clutching device, a drum shaped casing, a member rotatably mounted in said casing, said member comprising a hub portion, a plurality of axially extending bolts uniformly distributed circumferentially of the device adjacent to the radially outer portion of the casing, and axially spaced means rigid with said hub portion for carrying said bolts, there being peripherally extending spaces between said means radially inwardly of the bolts, and a quantity of powdered material in said casing.

11. In a clutching device, a drum shaped casing, a member rotatably mounted in said casing, said member comprising a hub portion, a plurality of axially extending bolts uniformly distributed circumferentially of the device adjacent to the radially outer portion of the casing, and a plurality of axially spaced radially extending members for carrying said bolts, there being peripherally extending spaces radially inwardly of the bolts and a quantity of powdered material in said casing.

In testimony whereof I have signed my name.

CARL AUGUST RUDQVIST.